United States Patent
Hinch et al.

(10) Patent No.: US 12,306,789 B2
(45) Date of Patent: May 20, 2025

(54) PERFORMANCE ISLANDS FOR CPU CLUSTERS

(71) Applicant: Apple Inc., Cupertino, CA (US)

(72) Inventors: Bryan R. Hinch, Campbell, CA (US); John G. Dorsey, San Francisco, CA (US); Ronit Banerjee, Cupertino, CA (US); Kushal Dalmia, Santa Clara, CA (US); Daniel A. Chimene, San Francisco, CA (US); Jaidev P. Patwardhan, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/893,913

(22) Filed: Aug. 23, 2022

(65) Prior Publication Data

US 2023/0067109 A1     Mar. 2, 2023

Related U.S. Application Data

(60) Provisional application No. 63/238,578, filed on Aug. 30, 2021.

(51) Int. Cl.
*G06F 9/48* (2006.01)
*G06F 11/34* (2006.01)
*G06F 15/78* (2006.01)

(52) U.S. Cl.
CPC ........ *G06F 15/7896* (2013.01); *G06F 9/4881* (2013.01); *G06F 11/3495* (2013.01)

(58) Field of Classification Search
CPC .......................... G06F 9/4881; G06F 15/7896
See application file for complete search history.

(56) References Cited

U.S. PATENT DOCUMENTS

| | | | | |
|---|---|---|---|---|
| 2015/0261571 A1* | 9/2015 | Arun | ...................... | G06F 3/1446 |
| | | | | 345/522 |
| 2016/0092274 A1* | 3/2016 | Singh | .................... | G06F 9/5094 |
| | | | | 718/104 |
| 2018/0349191 A1* | 12/2018 | Dorsey | ................. | G06F 9/3851 |
| 2019/0243689 A1* | 8/2019 | Åberg | .................... | G06F 9/5033 |
| 2020/0236038 A1* | 7/2020 | Liu | .......................... | H04L 47/76 |
| 2020/0310865 A1* | 10/2020 | Herdrich | ............... | G06F 9/4818 |
| 2020/0326985 A1* | 10/2020 | Ippatapu | .................. | G06N 3/08 |
| 2021/0191778 A1* | 6/2021 | Harwani | ............... | G06F 9/5005 |

\* cited by examiner

*Primary Examiner* — Michael J Metzger
(74) *Attorney, Agent, or Firm* — Sterne, Kessler, Goldstein & Fox P.L.L.C.

(57) ABSTRACT

Embodiments include an asymmetric multiprocessing (AMP) system having two or more central processing unit (CPU) clusters of a first core type and a CPU cluster of a second core type. Some embodiments include determining a control effort for an active thread group, and assigning the thread group to a first performance island according to the control effort range of the first performance island. The first performance island can include a first CPU cluster of the first core type, where a second performance island includes a second CPU cluster of the first core type, where the second performance island corresponds to a different control effort range than the first performance island. Some embodiments include assigning the first CPU cluster as a preferred CPU cluster of the first thread group, and transmitting a first signal identifying the first CPU cluster as the preferred CPU cluster assigned to the first thread group.

20 Claims, 12 Drawing Sheets

PERFORMANCE ISLANDS FOR CPU CLUSTERS

CROSS-REFERENCE TO RELATED APPLICATIONS

This application claims benefit of U.S. Provisional Application No. 63/238,578, filed on Aug. 30, 2021, entitled, Performance Islands for CPU Clusters, which is incorporated herein by reference in its entirety.

BACKGROUND

Field

The embodiments relate generally to central processing unit (CPU) clusters with performance islands in a computing device.

SUMMARY

Some embodiments include a system, apparatus, method, and computer program product for performance islands for central processing unit (CPU) clusters. Some embodiments include a method for operating a computing system including two or more CPU clusters of a first core type (e.g., performance core (P-Core)) and a CPU cluster of a second core type (e.g., efficiency core (E-Core)). The method can include determining a control effort for a first thread group that is active, and based at least on the control effort, determining placement of the first thread group to a first performance island including a first CPU cluster of P-Cores, where a second performance island includes a second CPU cluster of P-Cores, and where the second performance island corresponds to a different control effort range than the first performance island.

Some embodiments include assigning the first CPU cluster corresponding to the first performance island as a preferred CPU cluster of the first thread group, and transmitting a first signal identifying the first CPU cluster as the preferred CPU cluster assigned to the first thread group. Some embodiments include determining that the first performance island does not include an active thread group assigned to any CPU clusters of the first performance island, assigning the first CPU cluster from the first performance island to the second performance island, and distributing one or more thread groups in the second performance island to the first CPU cluster of the second performance island. Based on the distribution, some embodiments include transmitting a signal identifying the first CPU cluster as a preferred CPU cluster assigned to a second thread group of the second performance island.

Some embodiments include rotating assigned CPU clusters. For example, some embodiments include reassigning the first CPU cluster from the first performance island to the second performance island, and reassigning the second CPU cluster from the second performance island to the first performance island. Based on the reassigning of the first CPU cluster, some embodiments include assigning the first CPU cluster as a preferred CPU cluster for one or more thread groups that were previously assigned to any CPU cluster of the second performance island, and transmitting a second signal identifying the first CPU cluster as the preferred CPU cluster assigned to the one or more thread groups. In some embodiments, the reassigning the first CPU cluster of the first performance island is periodic in time, based at least on a temperature differential measurement, and/or based at least on a weighted product of time and voltage.

Some embodiments include receiving edge weights, and directing spillage of loads from the first CPU cluster of the first performance island to the second CPU cluster of the second performance island, based at least on the edge weights.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
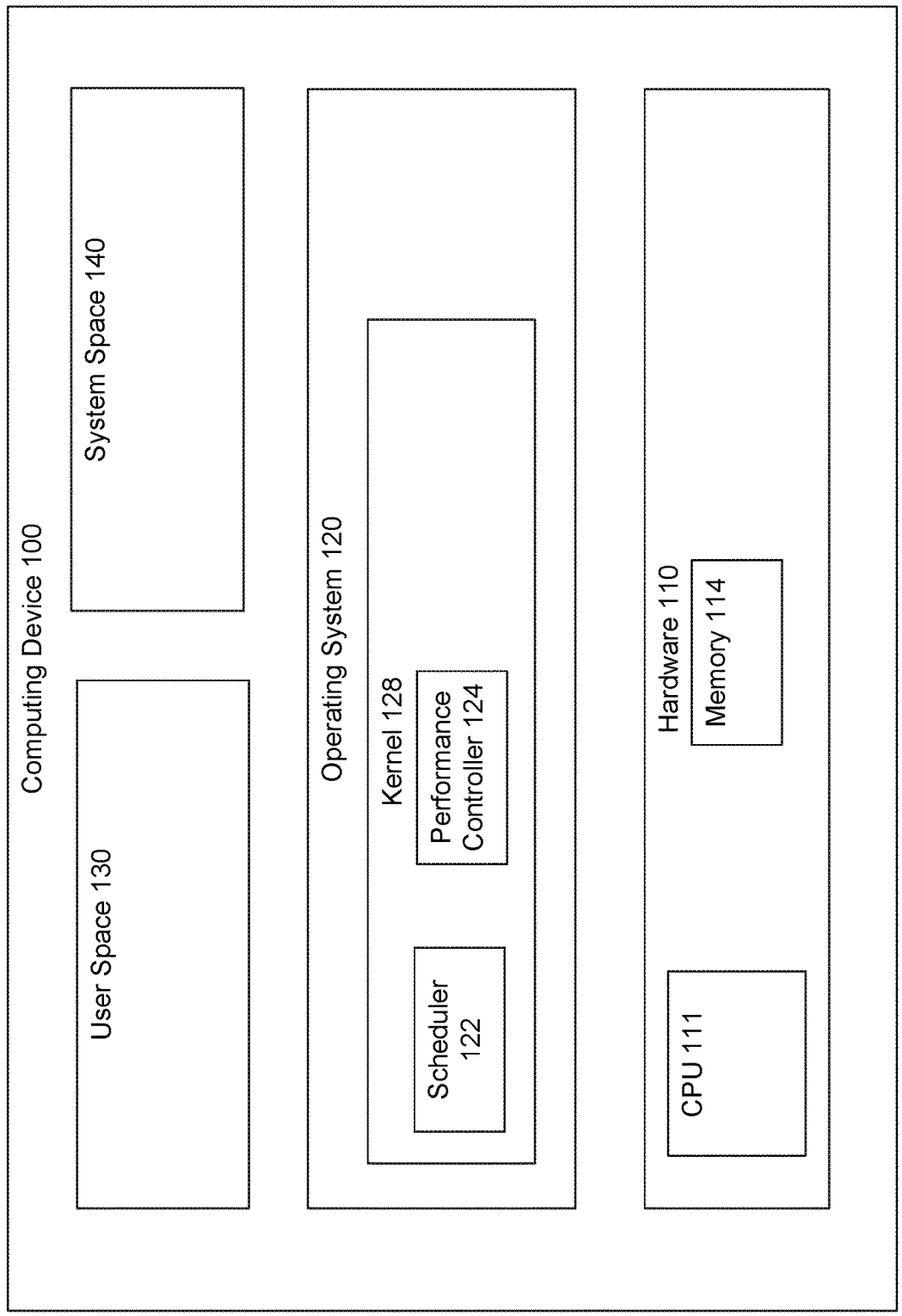
FIG. 1 illustrates an example system with performance islands for central processing unit (CPU) clusters, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include a system, apparatus, method, and computer program product for performance islands for central processing unit (CPU) clusters.

FIG. 1 illustrates example system 100 with performance islands for central processing unit (CPU) clusters, in accordance with some embodiments of the disclosure. System 100 can be a computing device including but not limited to a computer, laptop, mobile phone, tablet, and personal digital assistant. System 100 can be a computing device that includes hardware 110, operating system 120, user space 130, and system space 140. Hardware 110 can include CPU 111 that can include a plurality of CPU clusters, where each CPU cluster includes up to a number (n) of independent processing units called CPU cores. In an example, n=4. When the plurality of CPU clusters include CPU cores of a same CPU core type, CPU 111 can be considered a symmetric multiprocessing system (SMP). When at least one CPU cluster of the plurality of CPU clusters include CPU cores of a different type, CPU 111 is considered an asymmetric multiprocessing system (AMP). Core types can include performance cores (P-core), efficiency cores (E-core), graphics cores, digital signal processing cores, and arithmetic processing cores. A P-core can have an architecture that is designed for very high throughput and may include specialized processing such as pipelined architecture, floating point arithmetic functionality, graphics processing, or digital signal processing. A P-core may consume more energy per instruction than an E-core. An E-core may consume less energy per instruction than a P-core.

Memory 114 can be any type of memory including dynamic random-access memory (DRAM), static RAM, read-only memory (ROM), flash memory, or other memory device. Storage can include hard drive(s), solid state disk(s), flash memory, USB drive(s), network attached storage, cloud storage, or other storage medium. In an embodiment, CPU 111 can comprise a system on a chip (SoC) that may include other hardware elements of hardware 110.

Operating system 120 can include a kernel 128, scheduler 122, and performance controller 124 as well as operating system services (not shown.) Scheduler 122 can include interfaces to CPU 111, and can include thread group logic that enables performance controller 124 to measure, track, and control performance of threads by thread groups. Performance controller 124 manages execution efficiency by understanding the performance needs of software workloads and configuring performance features of CPU 111 to meet those needs. Performance controller 124 can include logic to receive sample metrics from scheduler 122, process the sample metrics per thread group, and determine a control effort needed to meet performance targets for the threads in the thread group. Herein, control effort represents an amount of performance or efficiency that the thread group should receive to meet performance targets for the thread group. The sample metrics may be processed on the order of milliseconds (e.g., 2 msec, 4 msec.) Performance controller 124 can recommend a core type (e.g., P-type, E-type) and dynamic voltage and frequency scaling (DVFS) state for processing threads of the thread group.

User space 130 can include one or more application programs and one or more work interval object(s). System space 140 can include processes such a launch daemon and other daemons not shown (e.g. media service daemon and animation daemon.) Communications can occur between kernel 128, user space 130 processes, and system space 140 processes.

Figure 2:
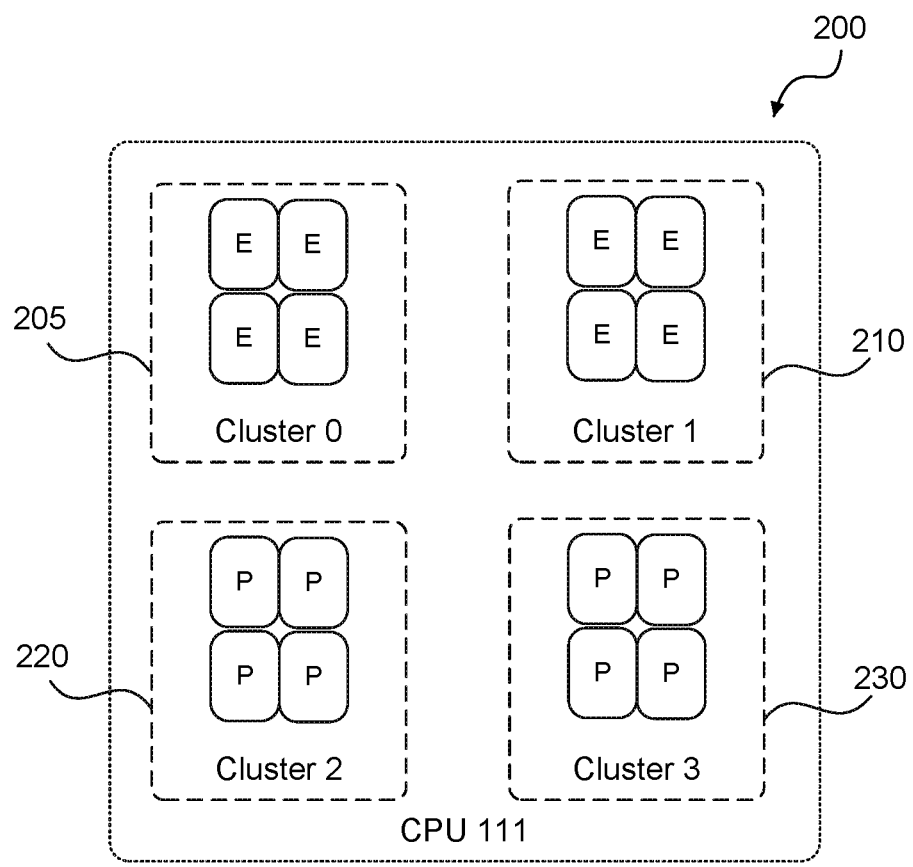
FIG. 2 illustrates an example CPU with CPU clusters, in accordance with some embodiments of the disclosure.

FIG. 2 illustrates example 200 of CPU 111 with CPU clusters, in accordance with some embodiments of the disclosure. As a convenience and not a limitation, FIG. 2 may be described with reference to elements from other figures in the disclosure. For example, example 200 can refer to CPU 111 of FIG. 1, where CPU 111 is an asymmetric multiprocessing system (AMP). Example 200 includes four CPU clusters 0-3: CPU cluster 0 205, CPU cluster 1 210, CPU cluster 2 220, CPU cluster 3 230. Some embodiments may include additional CPU clusters (not shown.) Each CPU cluster includes a number of CPU cores, for example, four CPU cores: 4 E-cores or 4 P-cores. As shown, CPU cluster 0 205 and CPU cluster 1 210 each include 4 E-Cores. Whereas, CPU cluster 2 220 and CPU cluster 3 230 each include 4 P-cores Performance controller 124 can periodically sample each thread group, determine a new control effort, and a preferred CPU cluster on which a thread group should run. Performance controller can inform scheduler 122 of the preferred CPU cluster, and scheduler 122 can schedule the thread group to run on the preferred CPU cluster.

Figure 3:
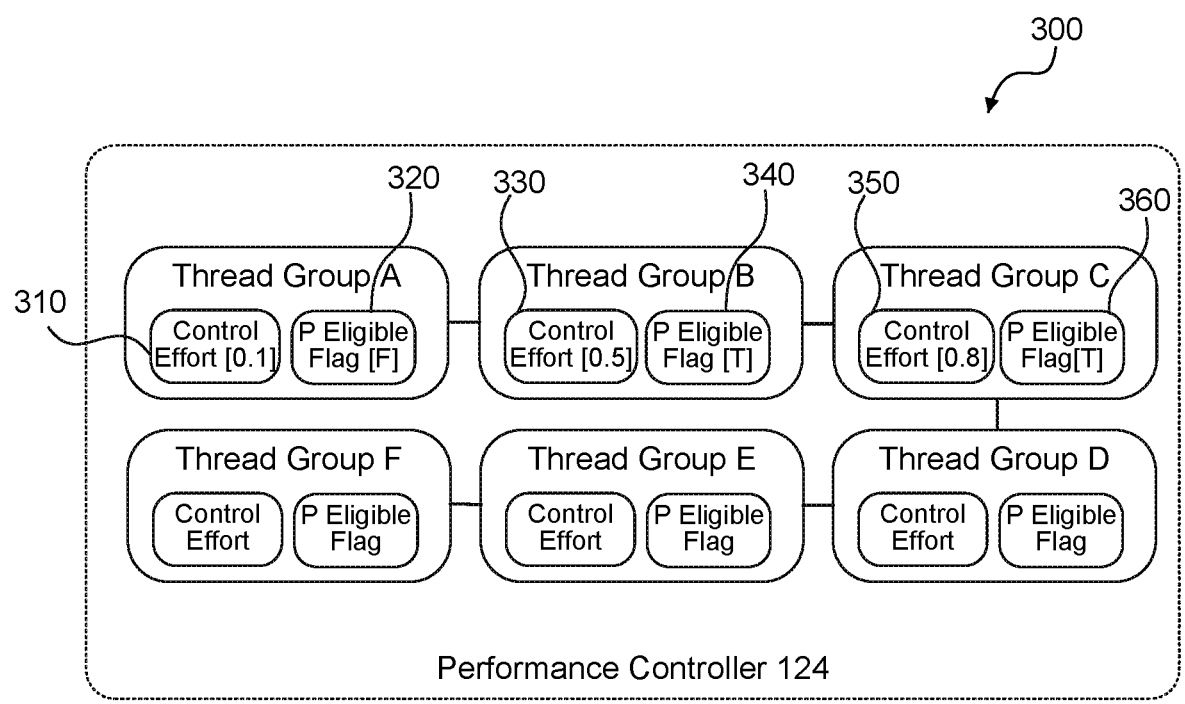
FIG. 3 illustrates an example of updating a thread group's preferred CPU cluster using an eligibility flag, according to some embodiments of the disclosure.

FIG. 3 illustrates example 300 of updating a thread group's preferred CPU cluster using an eligibility flag, according to some embodiments of the disclosure. As a convenience and not a limitation, FIG. 3 may be described with reference to elements from other figures in the disclosure. For example, example 300 can refer to CPU 111 of FIG. 1, where CPU 111 is an AMP system, and CPU 111 of FIG. 2.

Example 300 includes thread groups A-F. For each thread group, performance controller 124 determines a control effort that corresponds a performance level of a CPU cluster, and determines whether a thread group should run on a P-cluster (e.g., CPU cluster 2 220, or CPU cluster 3 230 of FIG. 2). A performance (P) eligible flag being true indicates that a thread group should be run on a CPU cluster with P-cores. A P eligible flag being false indicates that a thread group should be run on a CPU cluster with E-cores. When a thread group is eligible to run on a CPU cluster with P-cores, performance controller 124 can continue to add thread groups to a CPU cluster with P-cores until the thread load is exceeded and the thread load spills onto another CPU cluster with P-cores.

In example 300, performance controller 124 samples thread group A and determines that control effort 310 is 0.1, which below a predetermined threshold, e.g. 0.5. Given that low control effort, performance controller 124 determines that thread group A should not run on a P-cluster, and sets P eligible flag 320 to False [F]. Performance controller 124 can determine that thread group A should be assigned to a first E-cluster ID (e.g., CPU cluster 0 205 of FIG. 2) as the preferred CPU cluster for thread group A. Subsequently, performance controller 124 transmits a signal to scheduler 122 indicating that thread group A should be assigned to CPU cluster 0 205 as the preferred CPU cluster for thread group A. Scheduler 122 can schedule thread group A accordingly, to run on CPU cluster 0 205.

Performance controller 124 can sample thread group B and determine that control effort control effort 330 is 0.5, which at or above the predetermined threshold. Given that control effort, performance controller 124 determines that thread group B should run on a P-cluster, and sets P eligible flag 340 to True [T]. Performance can determine that thread group B should be assigned to a first P-cluster ID (e.g., CPU cluster 2 220 of FIG. 2) as the preferred CPU cluster for thread group B. Subsequently, performance controller 124 transmits a signal to scheduler 122 indicating that thread group B should be assigned to CPU cluster 2 220 as the preferred CPU cluster for thread group B. Scheduler 122 can schedule thread group B accordingly, to run on CPU cluster 2 220.

Performance controller 124 can sample thread group C and determine that control effort 350 is 0.8. Given that control effort, performance controller 124 determines that thread group C should run on a P-cluster, and sets P eligible flag 360 to True [T]. Performance controller 124 can determine that thread group C should be assigned to the first P-cluster ID (e.g., CPU cluster 2 220 of FIG. 2) as the preferred CPU cluster for thread group C. Subsequently, performance controller 124 transmits a signal to scheduler 122 indicating that thread group C should be assigned to CPU cluster 2 220 as the preferred CPU cluster for thread group C. Scheduler 122 can schedule thread group C accordingly, to run on CPU cluster 2 220.

Further, performance controller 124 may raise the performance level of CPU cluster 2 220 when thread group C starts running on CPU cluster 2 220. In some examples, performance controller 124 may preemptively raise the performance level of CPU cluster 2 220 to match thread group C's control effort of 0.8 that is expected to run there. Because all CPU cores in a cluster share the same voltage domain, one thread group may cause another thread group to have more performance than needed. Having more performance than needed can result in excess power consumed, and the excess power consumption can be called a passenger tax. In this example, thread group B has a control effort of 0.5 but will end up consuming excess power because CPU cluster 2 220 have an increased performance level to match thread group C's control effort of 0.8. The excess power consumption due to thread group B running at the higher frequency and/or voltage is an unnecessary cost and inefficiency.

Some embodiments utilize performance islands for CPU clusters for performance controller 124 to address the excess power consumption (e.g., reduce the passenger tax) thereby increase efficiency of a computing device (e.g., system 100 of FIG. 1.) Some embodiments enable performance controller 124 to not only determine that a thread group should run on a CPU cluster with P-cores, but to also select a preferred CPU cluster according to a range of control efforts that meets a thread group's control effort. With performance islands, performance controller 124 can minimize passenger tax scenarios without negatively impacting overall performance, and scale across platforms with different numbers of CPU clusters. In some embodiments, the number of performance islands is less than or equal to the number of CPU clusters (e.g., the number of performance islands does not exceed the number of CPU clusters.)

In some embodiments, performance islands can be objects of performance controller 124 that collect and process thread groups with similar control efforts. A performance island can contain zero or more CPU clusters. A performance island serves a subset of the total performance range (e.g., range of control effort values.) Performance controller 124 can dynamically assign CPU clusters and thread groups to a performance island. Thus, a performance island ID replaces a P eligible flag in each thread group. After sampling a thread group, performance controller 124 places that thread group in a performance island that corresponds to the thread group's control effort, and assigns the thread group to prefer one of the CPU clusters assigned to that performance island.

Figure 4:
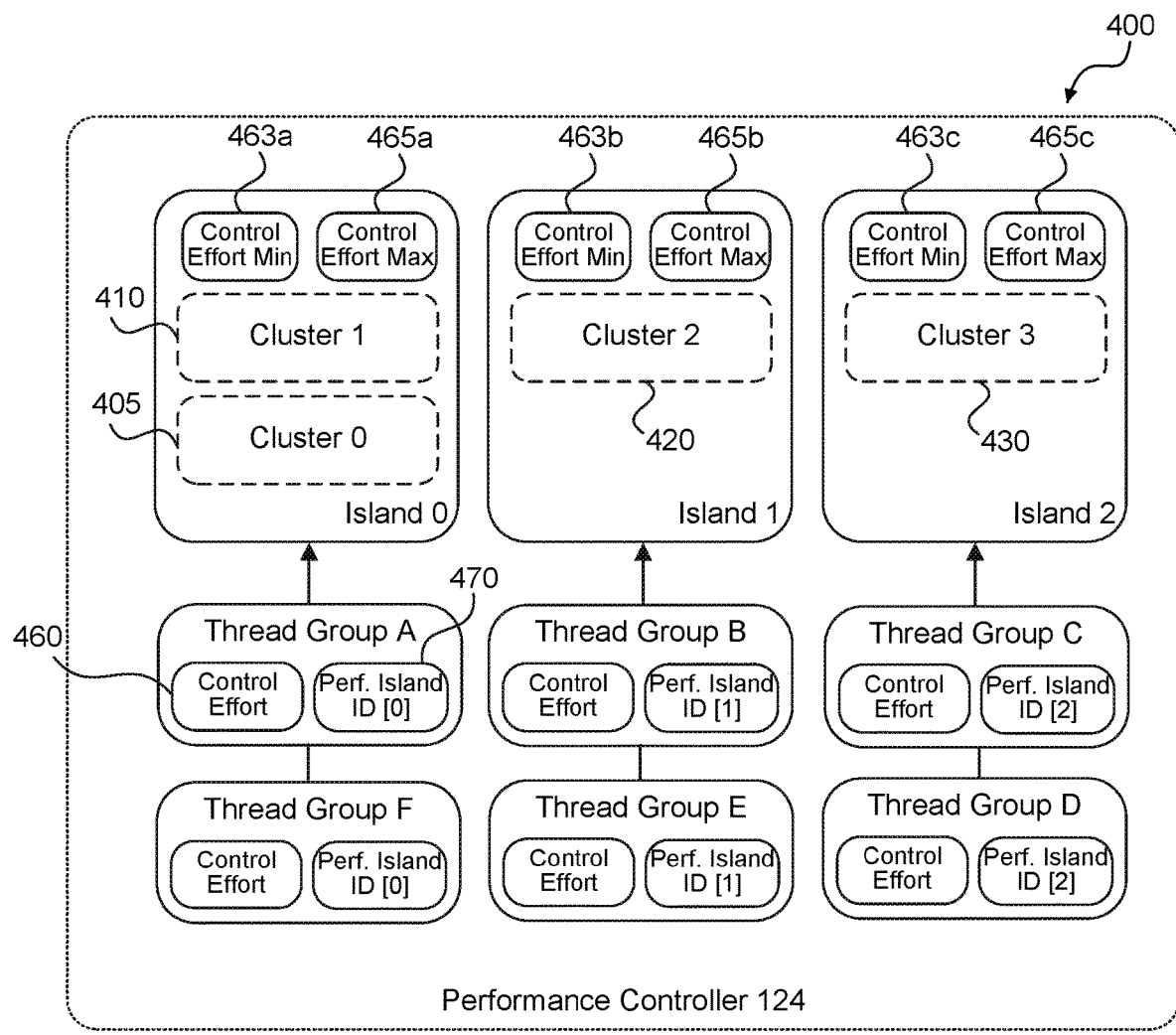
FIG. 4 illustrates an example of a performance controller using performance islands for CPU clusters, according to some embodiments of the disclosure.

FIG. 4 illustrates example 400 of performance controller 124 using performance islands for CPU clusters, according to some embodiments of the disclosure. As a convenience and not a limitation, FIG. 4 may be described with reference to elements from other figures in the disclosure. For example, example 400 can refer to CPU 111 of FIG. 1, where CPU 111 is an SMP system where all the CPU clusters include P-cores (not shown) and example 400 can include 4 CPU clusters 0-3 with P-cores (not shown). In some embodiments CPU 111 is an AMP system and example 400 can include 4 CPU clusters 0-3 with P-cores as well as other CPU clusters with E-cores (not shown).

Example 400 includes 3 performance islands: Island 0, Island 1, and Island 2. Each performance island serves a subset of the total performance range. For example, a performance island can serve a control effort range shown by control effort minimum 463 as a lower bound and control effort max 465 at a higher bound. Island 0 may serve control efforts 463a, 465a that are respectively greater than or equal to 0.2 and less than 0.4; Island 1 may serve control efforts 463b, 465b that are respectively greater than or equal to 0.4 and less than 0.6; and Island 2 may serve control efforts 463c that are greater than or equal to 0.6. In this example, 465c may be equal to 1.0. Thus, CPU clusters operating in Island 1 operate at a higher voltage and/or frequency than CPU clusters operating in Island 0. And, CPU clusters operating in Island 2 may operate at a higher voltage and/or frequency than CPU clusters operating in Island 1 or Island 0. Performance controller 124 may determine that thread groups needing control efforts less than 0.2 should run on a CPU cluster with E-cores (not shown).

Example 400 includes at least 4 CPU clusters that include P-cores: CPU cluster 0 405, CPU cluster 1 410, CPU cluster 2 420, and CPU cluster 3 430. Example 400 may include CPU clusters with E-cores that are not shown. Performance controller 124 can dynamically assign CPU cluster 0 405 and CPU cluster 1 410 to Island 0, CPU cluster 2 420 to Island 1, and CPU cluster 3 430 to Island 2. Example 400 includes thread groups A-F. Performance controller 124 samples each thread group and determines a control effort that corresponds a performance level of a CPU cluster, and determines to which performance island a thread group should be placed. Once a performance island is determined, performance controller 124 determines which CPU cluster of the selected performance island is assigned to the thread group as the preferred CPU cluster.

Performance controller 124 determines that thread group F has a control effort of 0.3, and based on the settings described above, assigns thread group F to Island 0. Further, performance controller 124 can select CPU cluster 0 405 or CPU cluster 1 410 to be the preferred CPU cluster for thread group F. Assuming that CPU cluster 0 405 is assigned as the preferred CPU cluster, performance controller 124 can transmit a signal to scheduler 122 indicating that thread group F should be assigned to a CPU cluster 0 405 as the preferred CPU cluster. Scheduler 122 can schedule thread group F accordingly, to run on CPU cluster 0 405.

Performance controller 124 determines that thread group E has a control effort of 0.5, and based on the settings described above, assigns thread group E to Island 1. Further, performance controller 124 can select CPU cluster 2 420 to be the preferred CPU cluster for thread group E. Performance controller 124 can transmit a signal to scheduler 122 indicating that thread group E should be assigned to a CPU cluster 2 420 as the preferred CPU cluster. Scheduler 122 can schedule thread group E accordingly, to run on CPU cluster 2 420.

Performance controller 124 determines that thread group D has a control effort of 0.8, and assigns thread group D to Island 2. Further, performance controller 124 can select CPU cluster 3 430 to be the preferred CPU cluster for thread group D. Performance controller 124 can transmit a signal to scheduler 122 indicating that thread group D should be assigned to a CPU cluster 3 430 as the preferred CPU cluster. Scheduler 122 can schedule thread group D accordingly, to run on CPU cluster 3 430.

Accordingly, thread group E with a control effort of 0.5 can be assigned to CPU cluster 2 420 on Island 1 and operate with a lower performance than thread group D that operates on Island 2 with a higher control effort of 0.8. Thus, the passenger tax and excess power consumption experienced in example 300 is avoided.

In some embodiments, scheduler 122 provides an edge weight matrix to performance controller 124 to manage load spillage among CPU clusters. For example, performance controller 124 can use the edge weight matrix to ensure that a load factor on a CPU cluster reaches a certain value before thread groups are spilled to other CPU clusters. The edge weights incentivize spilling to CPU clusters where the passenger tax is likely to be low before spilling to CPU clusters where the passenger tax is likely to be high. Some embodiments include keeping the edge weights between CPU clusters of the same type (e.g., P-core) low in absolute terms so that a thread group intended for running on a CPU cluster of P-cores may spill to a CPU cluster of P-cores or a CPU-cluster of E-cores, rather than to not run at all. In some embodiments, edge weights may be in microseconds.

Figure 5:
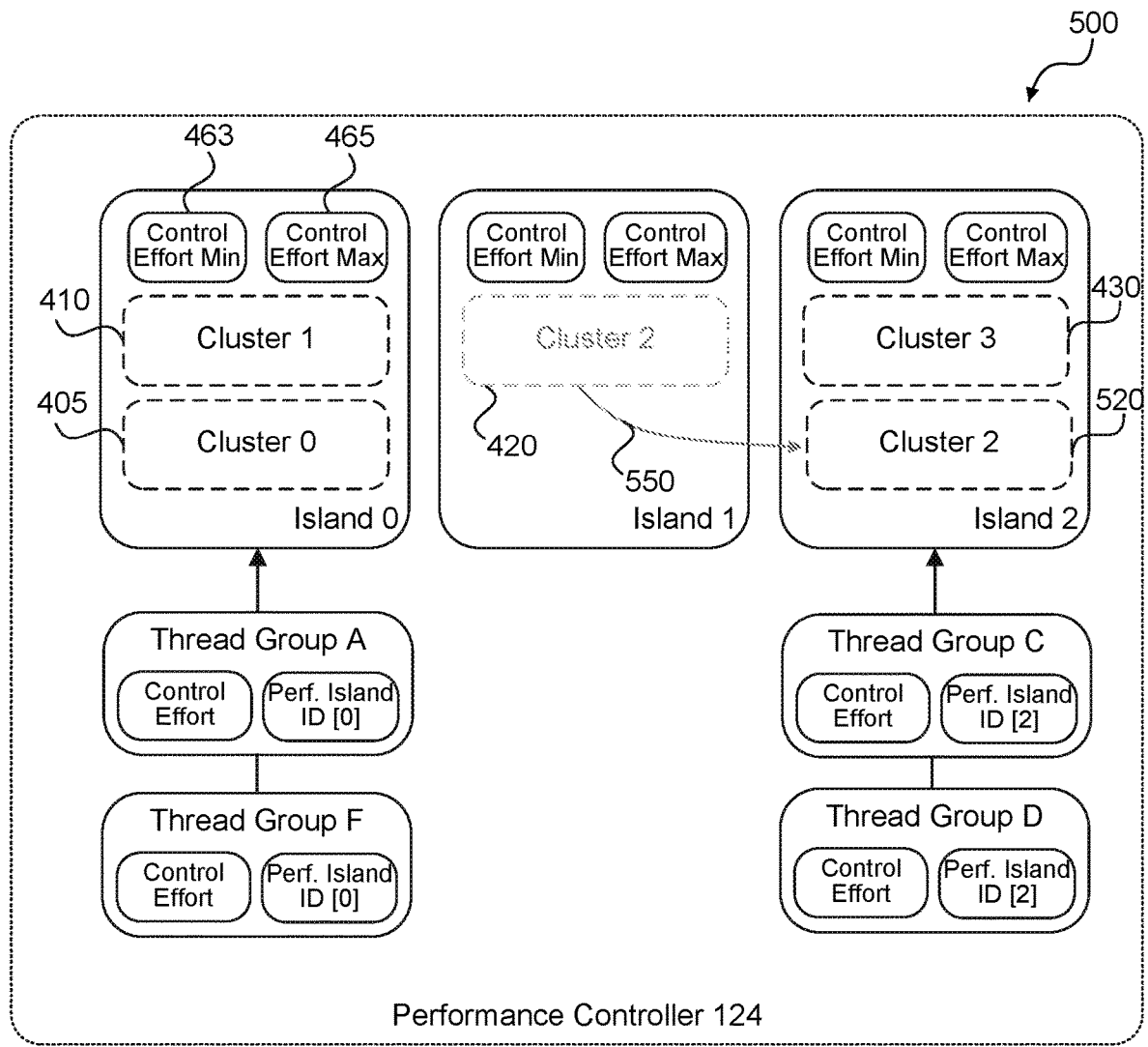
FIG. 5 illustrates an example of a performance controller moving a CPU cluster between performance islands for CPU clusters, according to some embodiments of the disclosure.

FIG. 5 illustrates example 500 of performance controller 124 moving a CPU cluster between performance islands for CPU clusters, according to some embodiments of the disclosure. As a convenience and not a limitation, FIG. 5 may be described with reference to elements from other figures in the disclosure. For example, example 500 can refer to CPU 111 of FIG. 1 or of FIG. 4. In example 500, performance controller 124 can determine that thread group B and thread group E no longer exist. Performance controller 124 can assign CPU cluster 2 420 to a different performance island such as Island 2. The assignment is shown at 550 as CPU cluster 2 is moved to Island 2 shown as CPU cluster 2 520. Performance controller 124 can take advantage of the addition of CPU cluster 2 520 and can redistribute thread groups in Island 2 across the CPU clusters assigned to Island 2. For example, thread group C can be assigned to CPU cluster 2 520 while thread group D can be assigned (or remain assigned) to CPU cluster 3 430.

Figure 6:
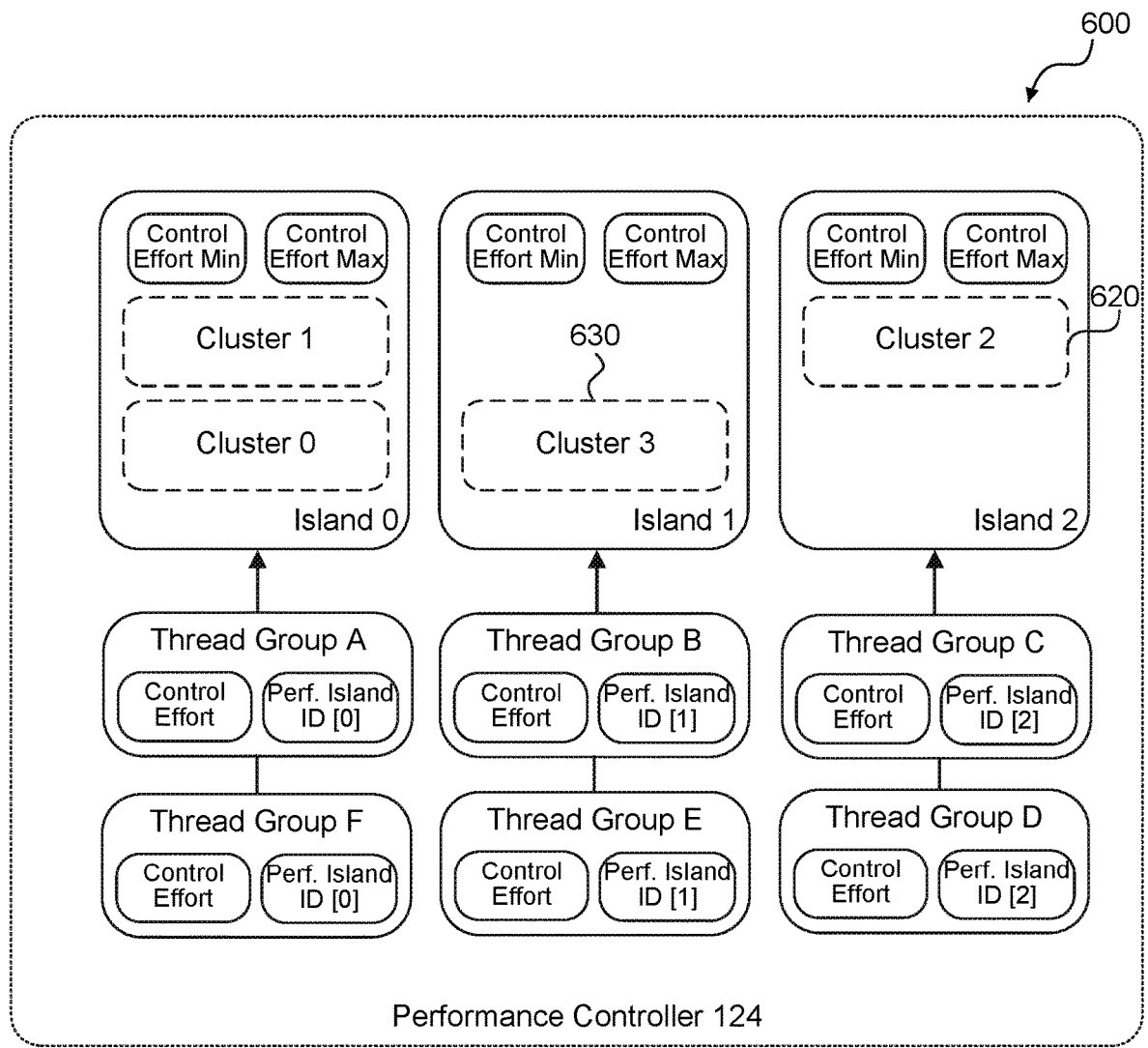
FIG. 6 illustrates another example of a performance controller using performance islands for CPU clusters, according to some embodiments of the disclosure.

FIG. 6 illustrates example 600 of performance controller 124 using performance islands for CPU clusters, according to some embodiments of the disclosure. As a convenience and not a limitation, FIG. 6 may be described with reference to elements from other figures in the disclosure. For example, example 600 can refer to CPU 111 of FIG. 1 or FIG. 5. In example 600, performance controller 124 has assigned (or moved) CPU cluster 3 630 to performance island, Island 1, while CPU cluster 2 620 remains in Island 2. In some embodiments, CPU cluster to performance island assignments can be rotated to enable uniform distribution of time spent at higher voltages. The rotation of assignments can help with short-term thermals (e.g., heat as a result of running at higher voltages and frequencies) as well as prolong silicon aging (e.g., long-term silicon aging.) For example, the P-cores operating in CPU cluster 2 620 in Island 2 are operating at higher voltages and frequencies than the P-cores operating in CPU cluster 3 630 in Island 1. Thus, CPU cluster 2 620 will incur higher temperatures that can affect silicon aging. By rotating CPU clusters, the short-term thermals as well as effects of silicon aging can be distributed across CPU clusters compared to CPU clusters that are statically assigned to a performance island.

Figure 7:
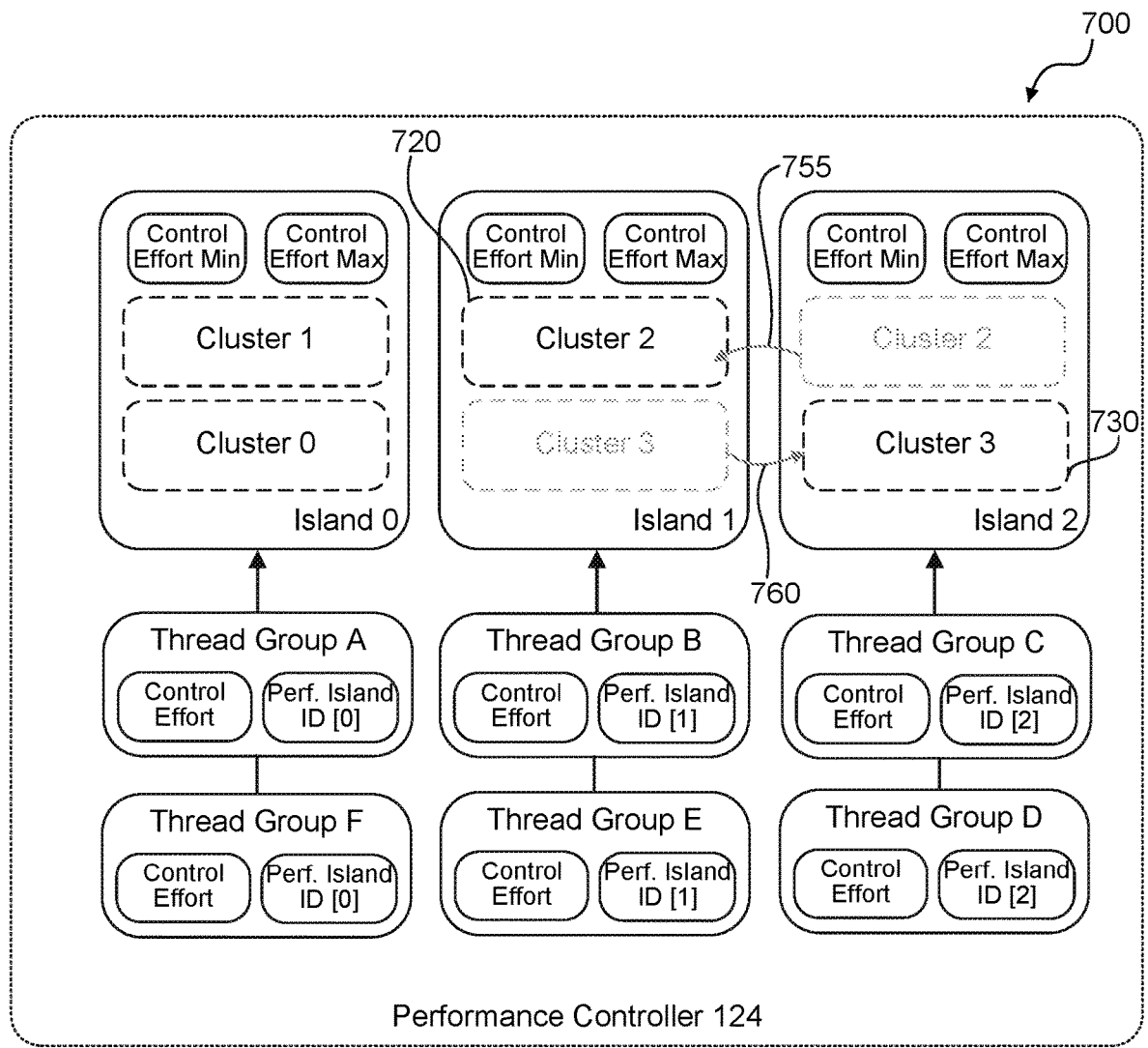
FIG. 7 illustrates an example of a performance controller rotating CPU clusters between performance islands for CPU clusters, according to some embodiments of the disclosure.

FIG. 7 illustrates example 700 of performance controller 124 rotating CPU clusters between performance islands for CPU clusters, according to some embodiments of the disclosure. As a convenience and not a limitation, FIG. 7 may be described with reference to elements from other figures in the disclosure. For example, example 700 can refer to CPU 111 of FIG. 1 or FIG. 6. In example 700, performance controller 124 occasionally rotates CPU clusters between or among performance islands. For example, performance controller 124 moves CPU cluster 3 to Island 2 shown as CPU cluster 3 730, and moves CPU cluster 2 to Island 1 shown as CPU cluster 2, 720. After the rotation, performance controller 124 may choose a new preferred CPU cluster for each thread group in a performance island that participated in a rotation. For example, performance controller 124 can assign thread groups B and E to CPU cluster 2 720 and assign thread groups C and D to CPU cluster 3 730. Performance controller 124 can transmit the thread group assignments to scheduler 122, and scheduler 122 assigns the thread groups to run on the respective preferred CPU clusters accordingly.

In some embodiments, the rotation policy can be: periodic (e.g., at a fixed time interval (e.g., milliseconds); based on the detection of a certain temperature measurement (e.g., temperature differential); and/or based on a certain amount of silicon aging. The silicon aging may be approximated as a weighted product of time and voltage.

Figure 8A:
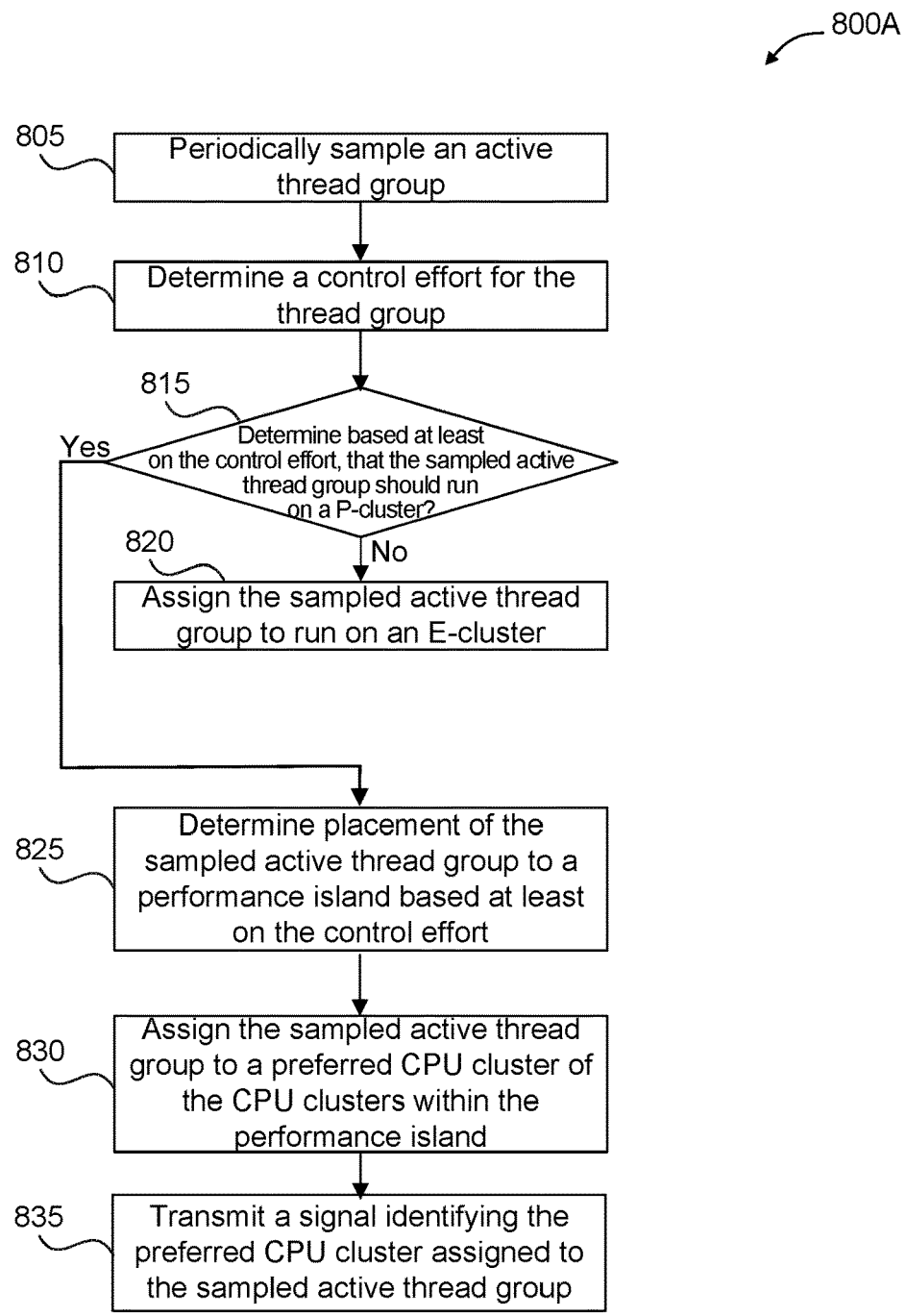
FIG. 8A illustrates an example method for a performance controller using performance islands for CPU clusters, according to some embodiments of the disclosure.

FIG. 8A illustrates example method 800A for performance controller 124 using performance islands for CPU clusters, according to some embodiments of the disclosure. As a convenience and not a limitation, FIG. 8A may be described with reference to elements from other figures in the disclosure. For example, method 800A can be performed by performance controller 124 of FIG. 1.

At 805, performance controller 124 can periodically sample an active thread group.

At 810, performance controller 124 can determine a control effort for the thread group that is sampled.

At 815, performance controller 124 determines based at least on the control effort whether the sampled active thread group should run on a P-cluster (e.g., a CPU cluster with P-cores). When performance controller 124 determines that the sampled active thread group should run on a P-cluster, method 800A proceeds to 825. Otherwise, method 800A proceeds to 820.

At 820, performance controller 124 assigns the sampled active thread group to run on an E-cluster (e.g., a CPU cluster with E-cores).

At 825, performance controller 124 determines placement of the sampled active thread group to a performance island that is selected from a plurality of performance islands based at least on the determined control effort.

At 830, performance controller 124 assigns the sampled active thread group to a preferred CPU cluster of the CPU clusters within the selected performance island.

At 835, performance controller 124 transmits a signal identifying the preferred CPU cluster assigned to the sampled active thread group. The signal can be transmitted to scheduler 122 of FIG. 1.

Figure 8B:
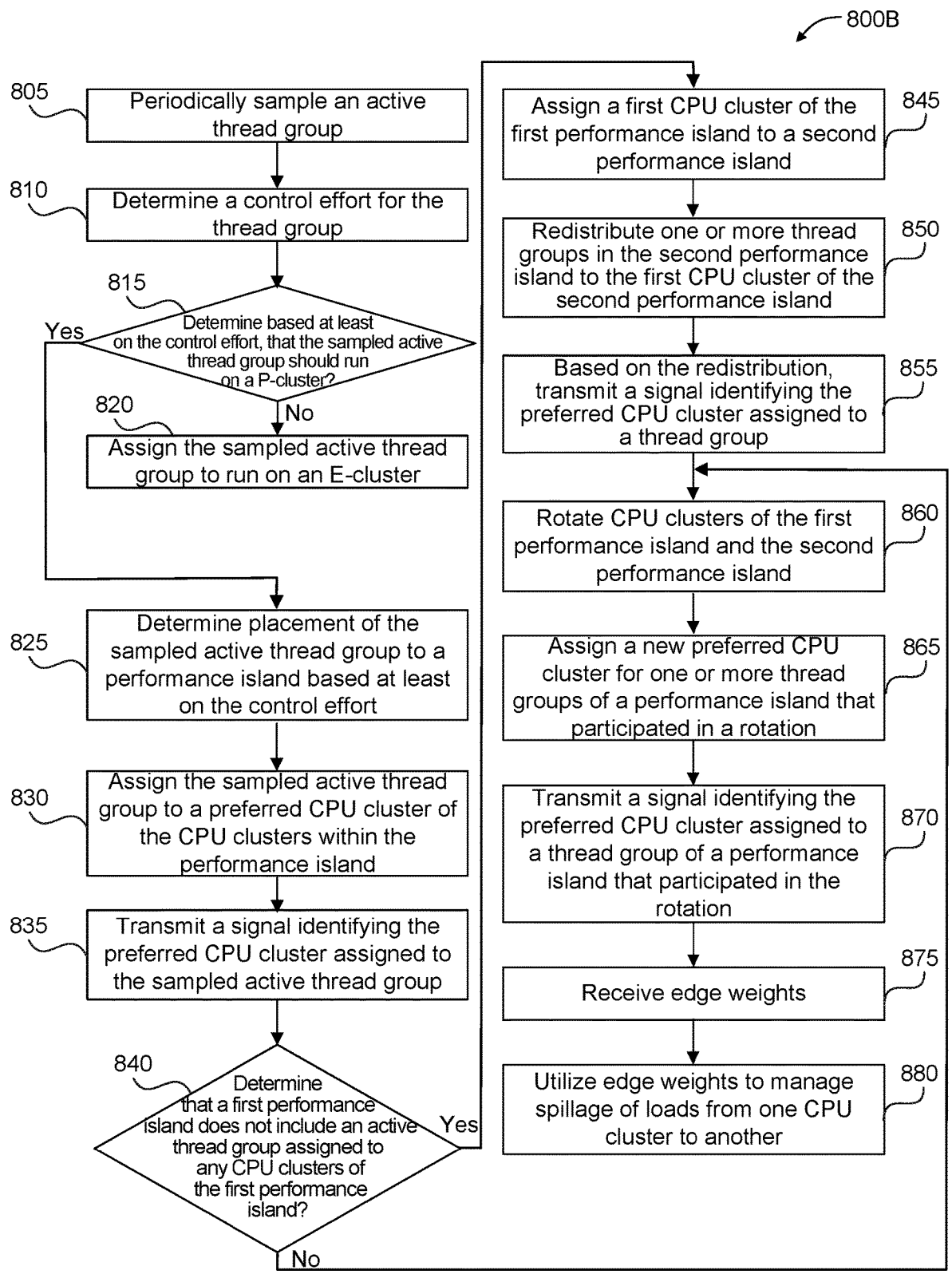
FIG. 8B illustrates another example method for a performance controller using performance islands for CPU clusters, according to some embodiments of the disclosure.

FIG. 8B illustrates another example method 800B for performance controller 124 using performance islands for CPU clusters, according to some embodiments of the disclosure. As a convenience and not a limitation, FIG. 8B may be described with reference to elements from other figures in the disclosure. For example, method 800B can be performed by performance controller 124 of FIG. 1.

At 805, performance controller 124 can periodically sample an active thread group.

At 810, performance controller 124 can determine a control effort for the thread group that is sampled.

At 815, performance controller 124 determines based at least on the control effort whether the sampled active thread group should run on a P-cluster (e.g., a CPU cluster with P-cores). When performance controller 124 determines that the sampled active thread group should run on a P-cluster, method 800B proceeds to 825. Otherwise, method 800B proceeds to 820.

At 820, performance controller 124 assigns the sampled active thread group to run on an E-cluster (e.g., a CPU cluster with E-cores).

At 825, performance controller 124 determines placement of the sampled active thread group to a performance island that is selected from a plurality of performance islands based at least on the determined control effort.

At 830, performance controller 124 assigns the sampled active thread group to a preferred CPU cluster of the CPU clusters within the selected performance island.

At 835, performance controller 124 transmits a signal identifying the preferred CPU cluster assigned to the sampled active thread group. The signal can be transmitted to scheduler 122 of FIG. 1.

At 840, performance controller 124 determines whether any performance island does not include any active thread group assigned to any CPU clusters. When a first performance island does not include any active thread group assignments, method 800B proceeds to 845. Otherwise, method 800B proceeds to 860.

At 845, performance controller 124 assigns a first CPU cluster of the first performance island to a second performance island.

At 850, performance controller 124 distributes one or more thread groups in the second performance island to the first CPU cluster of the second performance island.

At 855, based at least on the distribution, performance controller 124 transmits a signal identifying the preferred CPU cluster assigned to a thread group of the second performance island.

At 860, performance controller 124 can rotate CPU clusters of the first performance island and the second performance island.

At 865, performance controller 124 can assign a new preferred CPU cluster for one or more thread groups of a performance island that participated in a rotation.

At 870, performance controller 124 can transmit a signal identifying the preferred CPU cluster assigned to a thread group of a performance island that participated in the rotation.

At 875, performance controller 124 can receive edge weights.

At 880, performance controller 124 can utilize edge weights to manage spillage of loads from one CPU cluster to another.

Figure 9:
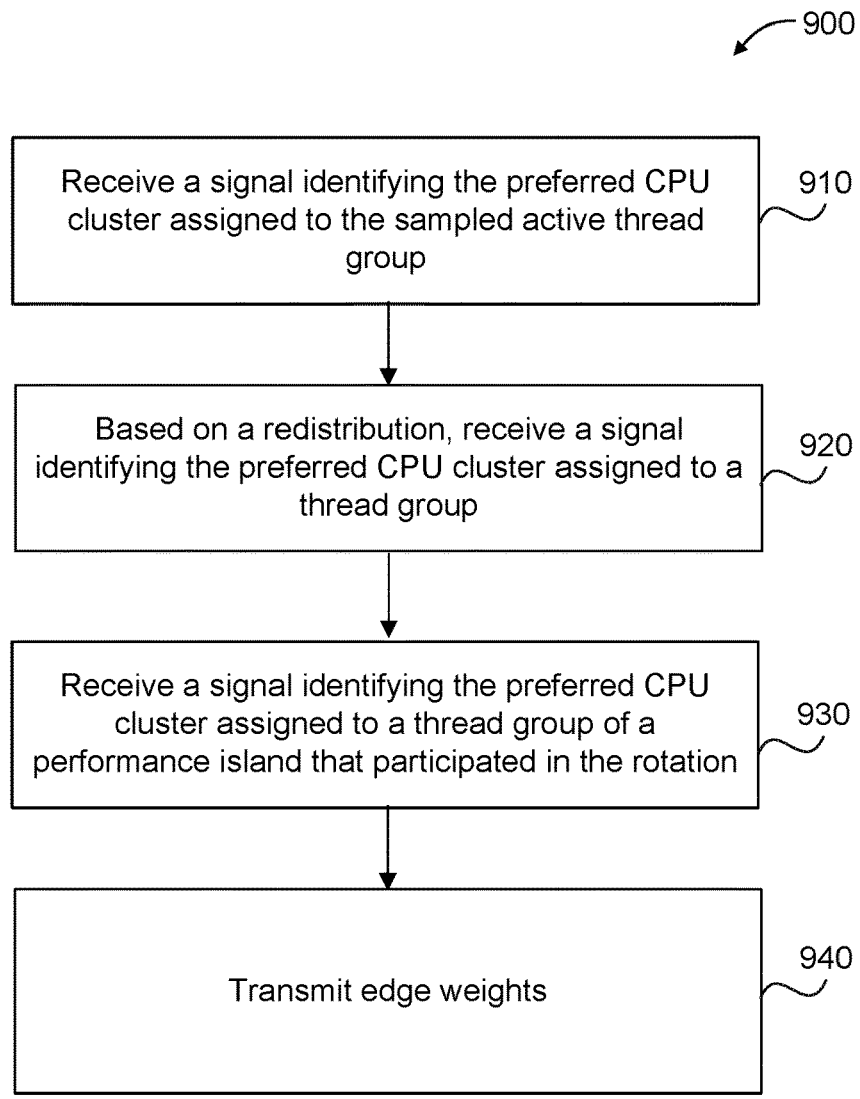
FIG. 9 illustrates an example method for a scheduler supporting performance islands for CPU clusters, according to some embodiments of the disclosure.

FIG. 9 illustrates an example method for a scheduler supporting performance islands for CPU clusters, according to some embodiments of the disclosure. As a convenience and not a limitation, FIG. 9 may be described with reference to elements from other figures in the disclosure. For example, method 900 can be performed by scheduler 122 of FIG. 1.

At 910, scheduler 122 can receive a signal identifying the preferred CPU cluster assigned to the sampled active thread group (e.g., after performance controller 124 has assigned the sampled active thread group to a performance island and a corresponding CPU cluster of the performance island as the preferred CPU cluster.) Scheduler 122 can schedule the sampled active thread group accordingly, to run on the preferred CPU cluster.

At 920, scheduler 122 can, based on a redistribution, receive a signal identifying the preferred CPU cluster assigned to a thread group (e.g., after performance controller 124 has moved a CPU cluster to a different performance island.) Scheduler 122 can schedule the thread group accordingly, to run on the preferred CPU cluster on the different performance island.

At 930, scheduler 122 can receive a signal identifying the preferred CPU cluster assigned to a thread group of a performance island that participated in a rotation. Scheduler 122 can schedule the thread group accordingly, to run on the preferred CPU cluster of a performance island that participated in a rotation.

At 940, scheduler 122 may transmit edge weights (e.g., an edge weight matrix) to performance controller 124 for controlling load spillage to different performance islands and corresponding CPU clusters. In some embodiments, one or more of the preferred CPU cluster assignments of the signals from 910, 920, and 930 may be assigned based at least on an edge weight of the edge weight matrix.

Figure 10:
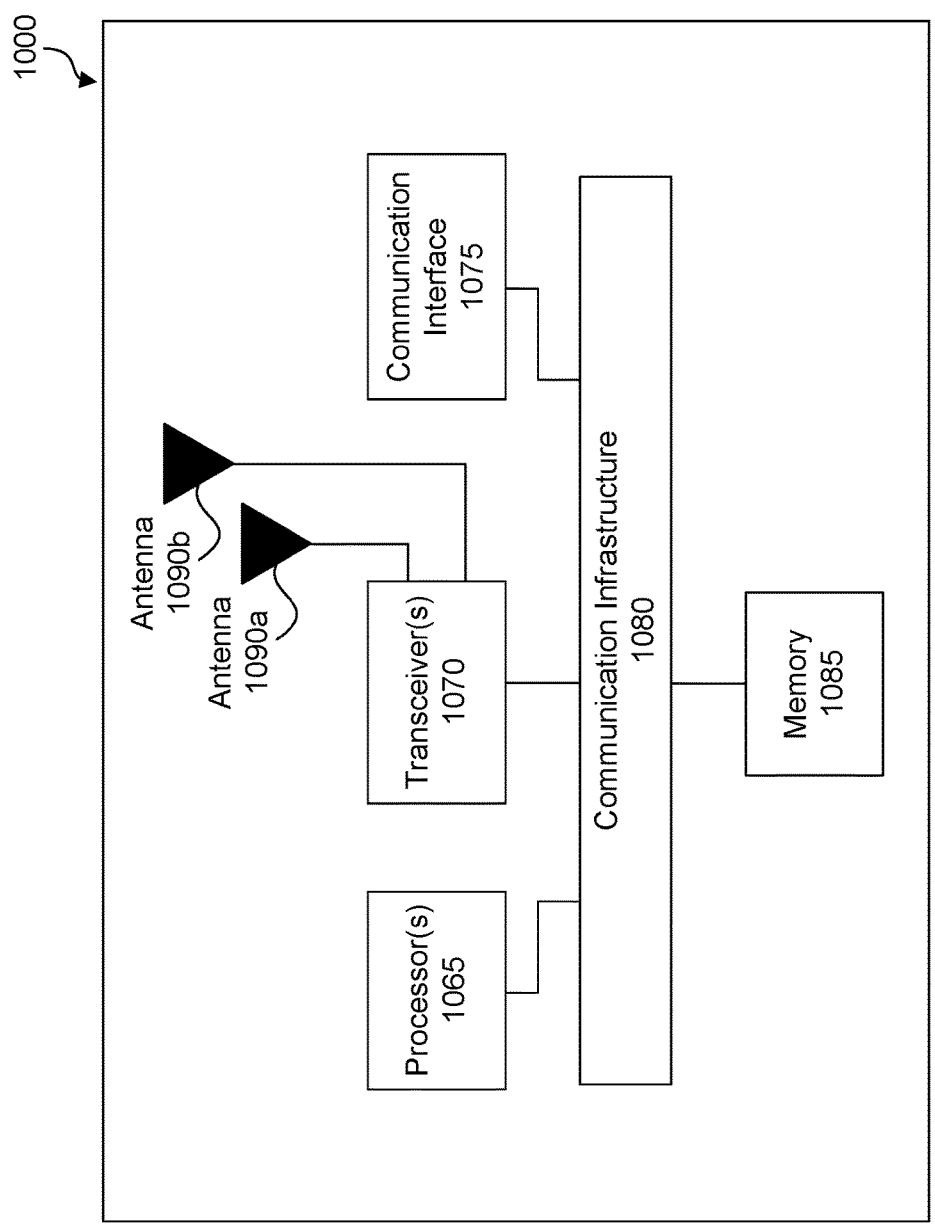
FIG. 10 illustrates a block diagram of an example wireless system operating with performance islands for CPU clusters, according to some embodiments of the disclosure.

FIG. 10 illustrates a block diagram of example wireless system 1000 operating with performance islands for CPU clusters, according to some embodiments of the disclosure. For explanation purposes and not a limitation, FIG. 10 may be described with reference to elements from FIG. 1. For example, and without limitation, system 1000 may perform the functions of: system 100 of FIG. 1; devices performing functions described in: Examples 200, 300, 400, 500, 600, and 700 of FIGS. 2-7; and devices performing functions of methods 800A, 800B, and 900 of FIGS. 8A, 8B, and 9.

System 1000 includes one or more processors 1065, transceiver(s) 1070, communication interface 1075, communication infrastructure 1080, memory 1085, and antenna 1090. Memory 1085 may include random access memory (RAM) and/or cache, and may include control logic (e.g., computer instructions) and/or data. One or more processors 1065 can execute the instructions stored in memory 1085 to perform operations enabling wireless system 1000 to transmit and receive wireless communications, including the functions for supporting performance islands for CPU clusters described herein. In some embodiments, one or more processors 1065 can be "hard coded" to perform the functions herein. Transceiver(s) 1070 transmits and receives wireless communications signals including wireless communications supporting performance islands for CPU clusters according to some embodiments, and may be coupled to one or more antennas 1090 (e.g., 1090a, 1090b). In some embodiments, a transceiver 1070a (not shown) may be coupled to antenna 1090a and different transceiver 1070b (not shown) can be coupled to antenna 1090b. Communication interface 1075 allows system 1000 to communicate with other devices that may be wired and/or wireless. Communication infrastructure 1080 may be a bus. Antenna 1090 may include one or more antennas that may be the same or different types.

Figure 11:
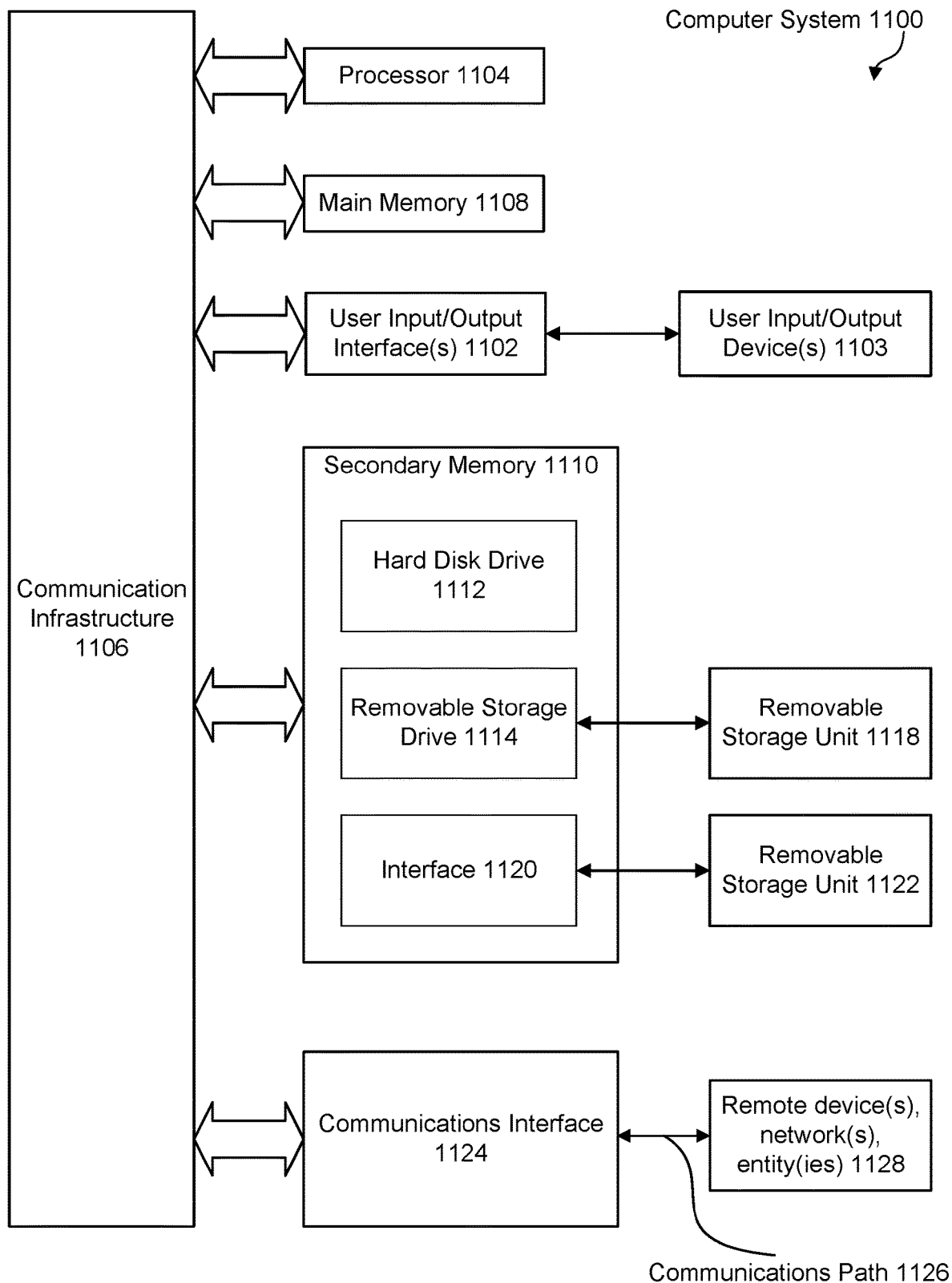
FIG. 11 is an example computer system for implementing some embodiments or portion(s) thereof.

Various embodiments can be implemented, for example, using one or more well-known computer systems, such as computer system 1100 shown in FIG. 11. Computer system 1100 can be any well-known computer capable of performing the functions described herein. For example, and without limitation, system 1100 may perform the functions of: system 100 of FIG. 1; devices performing functions described in: Examples 200, 300, 400, 500, 600, and 700 of FIGS. 2-7; and devices performing functions of methods 800A, 800B, and 900 of FIGS. 8A, 8B, and 9 (and/or other apparatuses and/or components shown in the figures) may be implemented using computer system 1100, or portions thereof.

Computer system 1100 includes one or more processors (also called central processing units, or CPUs), such as a processor 1104. Processor 1104 is connected to a communication infrastructure 1106 that can be a bus. One or more processors 1104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM). Main memory 1108 may include one or more levels of cache. Main memory 1108 has stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some embodiments, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 11. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method of operating a computing device comprising a central processing unit (CPU) including a first CPU cluster of a first core type and a second CPU cluster of the first core type, the method comprising:
   determining a first control effort for a first thread group, wherein the first thread group is an active thread group;
   based at least on the first control effort, determining placement of the first thread group to a first performance island comprising the first CPU cluster, wherein a second performance island comprises the second CPU cluster, and wherein the second performance island corresponds to a different control effort range than the first performance island;
   determining a second control effort for a second thread group, wherein the second control effort is higher than the first control effort; and
   determining placement of the second thread group to the second performance island, wherein the first thread group continues to operate at the first control effort on the first performance island.

2. The method of claim 1, further comprising:
   determining that the first performance island does not include an active thread group assigned to any CPU clusters of the first performance island;
   reassigning the first CPU cluster from the first performance island to the second performance island; and
   redistributing the second thread group to the first CPU cluster on the second performance island.

3. The method of claim 2, further comprising:
   based at least on the redistributing, transmitting a signal identifying the first CPU cluster as a preferred CPU cluster assigned to the second thread group of the second performance island.

4. The method of claim 1, further comprising:
   reassigning the second CPU cluster from the second performance island to the first performance island.

5. The method of claim 4, further comprising:
   based on the reassigning of the second CPU cluster, assigning the second CPU cluster as a preferred CPU cluster for a third thread group previously assigned to a CPU cluster of the first performance island; and
   transmitting a second signal identifying the second CPU cluster as the preferred CPU cluster assigned to the third thread group.

6. The method of claim 4, wherein the reassigning the first CPU cluster of the first performance island is periodic in time.

7. The method of claim 4, wherein the reassigning the first CPU cluster of the first performance island is based at least on a temperature differential measurement.

8. The method of claim 4, wherein the reassigning the first CPU cluster of the first performance island is based at least on a weighted product of time and voltage.

9. The method of claim 1, further comprising:
   receiving edge weights; and
   directing spillage of loads from the first CPU cluster of the first performance island to the second CPU cluster of the second performance island, based at least on the edge weights.

10. A non-transitory computer-readable medium storing instructions that, upon execution by a computing device comprising a central processing unit (CPU) including a first CPU cluster of a first core type and a second CPU cluster of the first core type, cause the computing device to perform operations, the operations comprising:
    determining a first control effort for a first thread group, wherein the first thread group is an active thread group;
    based at least on the first control effort, determining placement of the first thread group to a first performance island comprising the first CPU cluster, wherein a second performance island comprises the second CPU cluster, and wherein the second performance island corresponds to a different control effort range than the first performance island;
    determining a second control effort for a second thread group, wherein the second control effort is higher than the first control effort; and
    determining placement of the second thread group to the second performance island, wherein the first thread group continues to operate at the first control effort on the first performance island.

11. The non-transitory computer-readable medium of claim 10, wherein the operations further comprise:
    determining that the first performance island does not include an active thread group assigned to any CPU clusters of the first performance island;
    reassigning the first CPU cluster from the first performance island to the second performance island; and
    redistributing the second thread group to the first CPU cluster on the second performance island.

12. The non-transitory computer-readable medium of claim 11, wherein the operations further comprise:
    based at least on the redistributing, transmitting a signal identifying the first CPU cluster as a preferred CPU cluster assigned to the second thread group of the second performance island.

13. The non-transitory computer-readable medium of claim 10, wherein the operations further comprise:

reassigning the second CPU cluster from the second performance island to the first performance island.

14. The non-transitory computer-readable medium of claim 13, wherein the operations further comprise:
based on the reassigning of the second CPU cluster, assigning the second CPU cluster as a preferred CPU cluster for a third thread group previously assigned to a CPU cluster of the first performance island; and
transmitting a second signal identifying the second CPU cluster as the preferred CPU cluster assigned to the third thread group.

15. The non-transitory computer-readable medium of claim 13, wherein the reassigning the first CPU cluster of the first performance island is based at least on a weighted product of time and voltage.

16. The non-transitory computer-readable medium of claim 10, wherein the operations further comprise:
receiving edge weights; and
directing spillage of loads from the first CPU cluster of the first performance island to the second CPU cluster of the second performance island, based at least on the edge weights.

17. An electronic device comprising:
a memory; and
a central processing unit (CPU) comprising a first CPU cluster of a first core type and a second CPU cluster of the first core type, wherein the CPU is configured to:
determine a first control effort for a first thread group, wherein the first thread group is an active thread group;
based at least on the first control effort, determine placement of the first thread group to a first performance island comprising the first CPU cluster, wherein a second performance island comprises the second CPU cluster, and wherein the second performance island corresponds to a different control effort range than the first performance island;
determine a second control effort for a second thread group, wherein the second control effort is higher than the first control effort; and
determine placement of the second thread group to the second performance island, wherein the first thread group continues to operate at the first control effort on the first performance island.

18. The electronic device of claim 17, wherein the CPU is configured to:
determine that the first performance island does not include an active thread group assigned to any CPU clusters of the first performance island;
reassign the first CPU cluster from the first performance island to the second performance island; and
redistribute the second thread group to the first CPU cluster on the second performance island.

19. The electronic device of claim 17, wherein the CPU is configured to:
reassign the second CPU cluster from the second performance island to the first performance island.

20. The electronic device of claim 19, wherein the CPU is configured to:
based on the reassigning of the second CPU cluster, assign the second CPU cluster as a preferred CPU cluster for a third thread group previously assigned to a CPU cluster of the first performance island; and
transmit a second signal identifying the second CPU cluster as the preferred CPU cluster assigned to the third thread group.

* * * * *